United States Patent [19]
Wood

[11] Patent Number: 5,256,942
[45] Date of Patent: Oct. 26, 1993

[54] STABILIZATION SYSTEM FOR A FREELY ROTATABLE PLATFORM

[76] Inventor: Ross C. Wood, 633 California St., El Segundo, Calif. 90245

[21] Appl. No.: 879,612

[22] Filed: May 7, 1992

[51] Int. Cl.$^5$ .............................................. G01C 19/08
[52] U.S. Cl. .................................... 318/649; 74/5.34; 74/5.47; 74/5.6 D
[58] Field of Search ............... 318/582, 611, 648, 649; 74/5 R, 5.1, 5.12, 5.34, 5.37, 5.4, 5.47, 5.7, 5.6 D

[56] References Cited

U.S. PATENT DOCUMENTS

| | | |
|---|---|---|
| 3,396,920 | 8/1968 | Rosen et al. . |
| 3,398,341 | 8/1968 | Dooley et al. . |
| 3,412,239 | 11/1968 | Selinger et al. . |
| 3,491,228 | 1/1970 | Selvin . |
| 3,638,502 | 2/1972 | Leavitt et al. . |
| 3,758,051 | 9/1973 | Williams . |
| 3,986,092 | 10/1976 | Tijsma et al. . |
| 4,052,654 | 10/1977 | Kramer et al. . |
| 4,393,597 | 7/1983 | Picard et al. . |
| 4,949,026 | 8/1990 | Mead ................... 318/649 |
| 4,973,144 | 11/1990 | Malige ................. 350/500 |
| 5,024,112 | 6/1991 | Kidd ..................... 74/5.37 |
| 5,123,292 | 6/1992 | Woltering ............... 74/87 |

Primary Examiner—Bentsu Ro
Attorney, Agent, or Firm—Henry M. Bissell

[57] ABSTRACT

A stabilization system for space platforms, satellites and the like. One arrangement for demonstration purposes incorporates a frame and a pair of motor/flywheel units which are pivotably mounted to the frame. These units are retained in positions of alignment with the frame axis and energized briefly to develop a torque for rotating the frame. Retraction of a retaining pin permits the units to pivot by 90 degrees, immediately generating precession forces which abruptly stop the frame at the desired angular orientation.

21 Claims, 3 Drawing Sheets

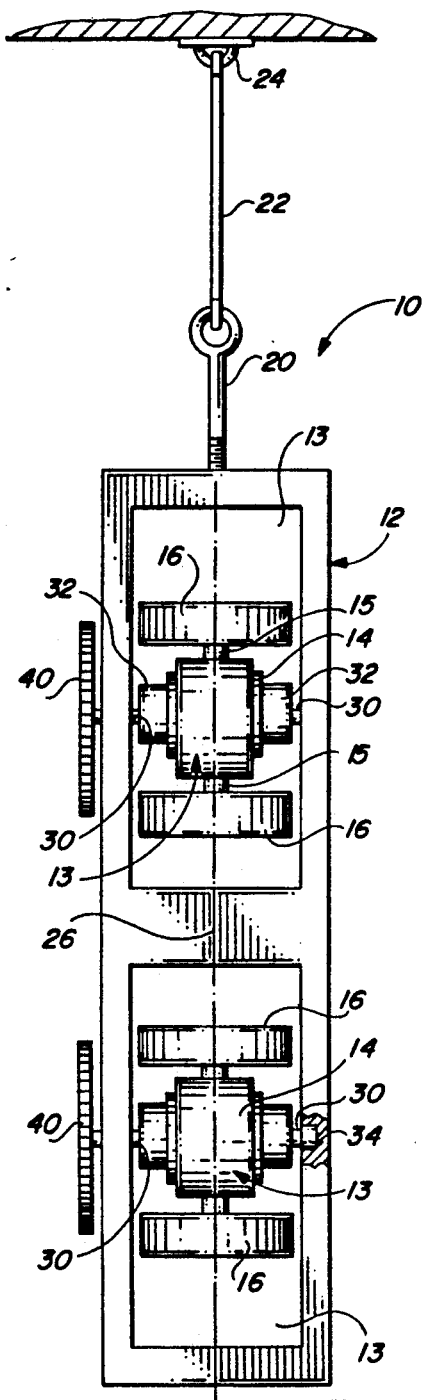
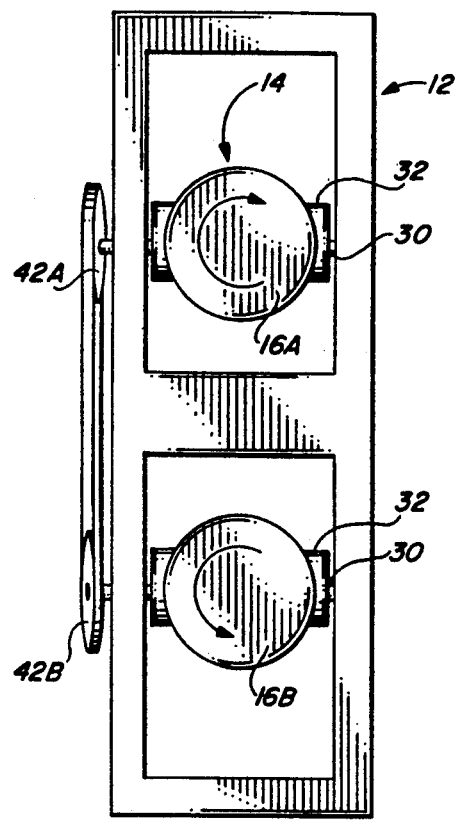
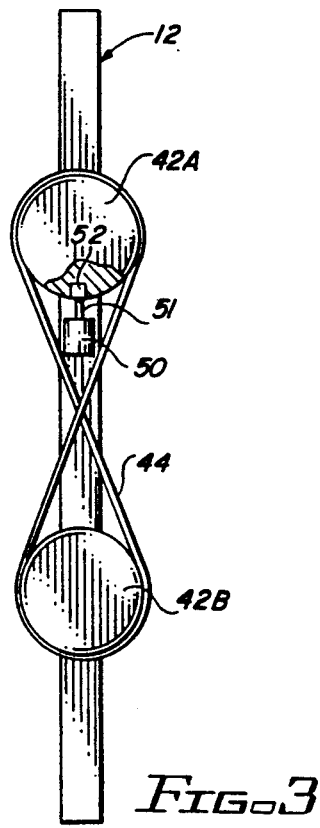
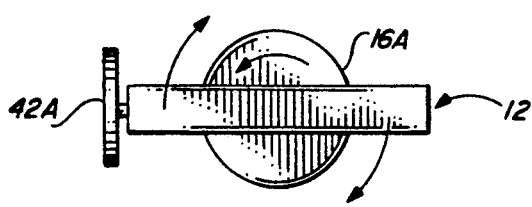
FIG.1
FIG.2
FIG.3
FIG.4

STABILIZATION SYSTEM FOR A FREELY ROTATABLE PLATFORM

BACKGROUND OF THE INVENTION

1. Field of the Invention

The present invention relates to systems for the stabilization of a freely rotatable platform and, more particularly, to a system for applying gyroscopic inertia and precession to control the orientation of such a platform.

2. Description of the Related Art

A 19th-Century French scientist, J.B.L. Foucault, is credited with having given the name gyroscope to a wheel, or rotor, mounted in gimbal rings; that is, a set of rings that permit it to turn freely in any direction. Shortly after the middle of the last century, he conducted an experiment using a rotor mounted in three supporting frames (a "three-frame gyroscope") and demonstrated that the spinning wheel maintained its original orientation in space regardless of the Earth's rotation. He derived the word "gyroscope" from the Greek gyros, "rotation", and skopein, "to view"; a method of "viewing" or demonstrating the rotation of the Earth.

In this century, gyroscopes and devices operating on gyroscopic principles have come into wide use in various types of guidance systems: gyrocompasses for ships, automatic pilot systems for ships and aircraft, guidance systems in torpedoes, ballistic missiles, and the like. So-called two-frame gyroscopes, having a spinning disk gimballed for rotation about only two axes, have been used in conjunction with three-frame gyroscopes in ballistic missiles to correct turn and pitch motion. During the first quarter of this century, such two-frame gyroscopes were utilized in gyrostabilizer systems to reduce the roll of ships.

The common schoolboy's "gyroscope", consisting of a rotatable wheel and axle mounted within a ring housing which has one or more projections in line with the rotational axis for support on a pedestal or string, is commonly available as a toy and may be used to demonstrate principles of gyroscopic inertia and precession.

In any gyroscope, the property by which the spinning rotor resists rotation of its axis is known as gyroscopic inertia or rigidity in space. This gyroscopic inertia is a function of the speed of the rotor and the distribution of its mass. Rotors with a high speed and a concentration of mass toward the rim of the wheel display the strongest gyroscopic inertia. In other words, the gyroscopic inertia depends on the angular velocity and the moment of inertia of the rotor, or on its angular momentum.

In a spinning gyroscope, if an attempt is made to change the direction of the axis of rotation, the change of such direction takes place at right angles to the applied force. This is commonly demonstrated using the single-frame toy gyroscope by supporting the ring-frame of the spinning gyroscope by resting one of the axial projections on a pedestal or string at approximately right angles to the axis of rotation. Gravity exerts a downward force upon the gyroscope, but the result is rotation about the point of support in a horizontal direction. This property is called "precession" and may be defined as the tendency of the rotor's axis to move at right angles to any perpendicular force applied to it. The direction of rotation of the rotor's axis, due to precession, is a function of the direction of rotation of the rotor and the direction of the applied perpendicular force.

Newton's Third Law of Motion states that for every action there is an equal and opposite reaction. Newton's Third Law of Motion for Rotation states in effect that if object A exerts a torque on object B along a given axis, then object B exerts an equal and opposite torque on object A along the same axis.

The unrestrained or "free" three-frame gyroscope has little practical use, because its spin axis is subject to tilting and drifting owing to the rotation of the Earth. Gyro-stabilized inertial reference systems, commonly employed in Earth satellites and other space vehicles, employ sensors which are "strapped down" to the vehicle so as to provide an indication of vehicle position, velocity and attitude under all conditions for the vehicle position and motion. Such systems may also include mechanisms for providing desired corrections in vehicle orientation, in response to output signals from such sensors and the orientation of the gyroscope elements in the inertial navigation system. A few of the many examples of background art in this field may be found in U.S. Pat. Nos. 3,398,341 of Dooley et al, 3,412,239 of Seliger et al, 3,491,228 of Selvin, 3,986,092 of Tijsma et al and 4,052,654 of Kramer et al.

Satellites and other space vehicles or particular movable components thereof, such as antennas, solar cell arrays and the like, may be oriented by reference to the sun or some distant star. However, the orientation of a satellite may shift slightly over time, due to factors such as solar radiation, magnetic fields and the like. It is known to provide the necessary compensation by equipping a satellite or other vehicle with one or more spin jets which use suitably controlled and timed jets of gas carried on board the vehicle to develop the desired correction of vehicle attitude. (See, for example, U.S. Pat. Nos. 3,396,920 of Rosen et al and 3,758,051 of Williams). The problem inherent in such systems resides in the fact that the supply of gas available on board the vehicle for the purpose of attitude correction is limited and eventually the supply is exhausted, at which time the satellite or other vehicle can no longer be maintained in the desired attitude and is for all practical purposes lost.

It would be desirable to be able to control the attitude of the satellite or other space vehicle through the use of some electromechanical or electromagnetic means. Ample electrical energy for driving such devices is available from solar arrays. However, to this point, the application of Newton's Third Law of Motion for Rotation has, to my knowledge, prevented the effective utilization of electromechanical or electromagnetic systems for space vehicle attitude orientation.

SUMMARY OF THE INVENTION

In brief, arrangements in accordance with the present invention combine the effects of gyroscopic inertia and precession in an operable system to change and control the attitude of a freely suspended support frame. In one particular embodiment of my invention, which I have constructed for the purpose of demonstrating the feasibility of the invention, I provide a pair of motor-driven gyroscopic devices mounted for common alignment along the longitudinal axis of the frame. This is the axis which is maintained vertical when the frame is suspended as I describe.

Each of the gyroscopic devices comprises an electric motor having a pair of balanced wheels or disks mounted on opposite ends of a central motor shaft. Each gyroscopic device is mounted on the frame on a corresponding pivot axis which is transverse to the motor shaft. The two gyroscopic devices are coupled together so as to force their rotations about the respective pivot axes to be in directions opposite to each other. This is effected in one embodiment by providing a sprocket wheel on each of the two pivot axis shafts and coupling the sprocket wheels together with a sprocket or gear belt oriented in a figure-8 configuration. A retaining pin and retracting solenoid are mounted on the frame in a position so that the pin can engage a radial hole on one of the sprocket wheels, thereby locking the sprocket wheels and gyroscopic devices in a fixed alignment position until the solenoid is energized to retract the pin.

In preparation for performing the demonstration of the operation of my suspended frame system, the gyroscopic devices, being un-energized and therefore not rotating, are moved into substantial alignment with the longitudinal axis of the frame, at which time the spring-loaded pin enters the retaining hole on one of the sprocket wheels, thereby locking the two gyroscopic devices in the aligned position. The entire system is suspended by supporting the frame with its longitudinal axis vertical from a cable or other suspension arrangement which permits free rotation of the frame about its vertical axis. The motors of the two gyroscopic devices are then energized to develop rotation of the motor shafts and associated pairs of disks in the same direction. In accordance with Newton's Third Law of Motion for Rotation, this causes the frame to begin rotating in the opposite direction. All that is needed is a pulse or short duration of energization of the gyroscopic device motors to set the frame in rotation in the opposite direction. When the frame reaches the desired angular orientation, the retracting solenoid is energized so that the pin is withdrawn from the retaining bore in the corresponding sprocket wheel.

With the retaining pin retracted, the gyroscopic devices are freed to rotate about their pivot axes, being constrained only to pivot in opposite directions. They immediately pivot to orientations approximately perpendicular to the vertical axis of the suspended frame. However, because the precession forces are now in opposite directions to each other, the frame is brought to an abrupt stop at the angular position attained when the retaining pin is withdrawn.

It should be understood that, in my demonstration model, the two gyroscopic devices are coupled in phased relationship to each other by the gear belt or other means in such a way that they are not in exact alignment when positioned in general alignment with the longitudinal axis of the frame. As a consequence, one of the gyroscopic devices will be slightly out of alignment with the vertical axis when the other gyroscopic device is aligned therewith. Preferably, this is the relative alignment which is assumed when the retracting pin is engaged in the corresponding hole in the associated sprocket gear. This establishes an initial pivoting force when the retaining pin is retracted, thereby enabling both of the gyroscopic devices to assume the orientation substantially at 90 degrees to the longitudinal axis of the support frame, thereby developing the desired opposing precession forces which result in the stopping of the frame rotation at the instant of pin retraction.

In an alternative arrangement in accordance with the invention, the coupling relationship between the two gyroscopic devices is effected by means of intercoupled servomechanisms instead of the figure-8 gear belt and sprocket gear structure. In such an arrangement, electrical signals from one servo are directed to the other servo, thereby producing rotation of both servos and their associated gyroscopic devices about their pivot axes in the same manner as described hereinabove with respect to the mechanically intercoupled arrangement.

In still another embodiment of my invention, the coupling between the two gyroscopic devices is provided by a pair of sector gears mounted on the pivot shafts and interengaged to provide for the required intercoupling. This embodiment also uses a small motor coupled to one of the pivot axes of the gyroscopic devices to drive the devices through the interconnected gearing to pivot to the position orthogonal to the support frame where the opposing precession forces are developed to stop the rotation of the frame.

Although the above-described embodiment of the invention finds utility as a demonstration model for illustrating the principles of gyroscopic action and precession forces in a single-axis configuration, it will be understood that corresponding results can be achieved by the installation of multi-axis embodiments of the invention in satellites and other space vehicles for directional stabilization thereof. Thus, in accordance with an aspect of the present invention, three individual stabilization systems corresponding to those which are described hereinabove may be mounted along mutually orthogonal axes in a space vehicle and utilized in accordance with the principles of the present invention to maintain directional stabilization of the vehicle by correcting deviations from the preselected directional orientations.

BRIEF DESCRIPTION OF THE DRAWING

A better understanding of the present invention may be realized from a consideration of the following detailed description, taken in conjunction with the accompanying drawings, in which:

FIG. 1 is a schematic drawing of one particular arrangement in accordance with the present invention;

FIG. 2 is another schematic view of the arrangement of FIG. 1 as shown in a different operating mode;

FIG. 3 is a side view of the arrangement of FIG. 1;

FIG. 4 is a top view of the arrangement of FIG. 1;

DETAILED DESCRIPTION OF THE PREFERRED EMBODIMENTS

Figure 5:
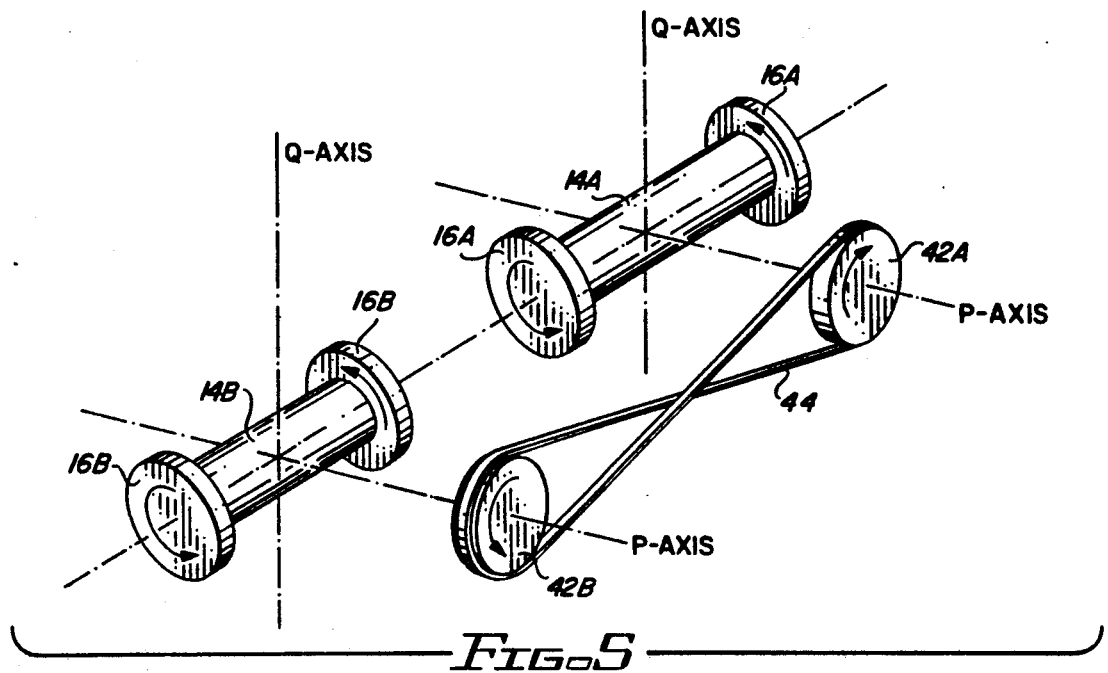
FIG. 5 is a schematic view illustrating the functional components of the arrangement of FIG. 1.

The schematic views of FIGS. 1-5 represent a particular embodiment of the present invention which is developed for demonstrating the concepts and operating principles of the invention. This model is capable of stabilization of an object relative to a single axis. As best shown in FIG. 1, the system 10 comprises a frame 12 having openings 13 in which a pair of motors 14 are pivotably mounted. Each motor has a shaft 15 which extends out of both ends of the motor. At each end a disk 16 is mounted on the shaft 15. The disks 16 are constructed to be like flywheels and have significant mass and are balanced for high speed rotation for developing substantial angular momentum when driven to rotate by the associated motor 14. The power cords for driving the motors from a control station are omitted for convenience of illustration.

The frame 12 is suspended by an eye-bolt 20 and a flexible cord 22 from a fixed bracket 24. The cord 22 is readily twistable in either direction as the frame 12 is rotated about a vertical axis, indicated by the dot-dash line 26.

Each motor/disk combination is pivotably mounted by means of a transverse axle 30, one on each side of the motor 14. The axles 30 extend outwardly from mounting blocks 32 which are affixed to the housing of the motor 14 and are pivotably supported in pivot bearings 34 installed in the side rails of the frame 12.

A pair of control elements 40 is installed along the left side rail of the frame 12, mounted on the left-side axles 30 which extend through the frame side rail. In one preferred embodiment, these elements 40 constitute a pair of sprocket wheels or sprocket gears which are interconnected by means of a gear belt 44 in the manner illustrated in FIG. 3. In an alternative arrangement, the elements 40 may comprise a pair of servomechanisms intercoupled in a manner known in the art to develop coordinated rotation in the manner effected by the arrangement of sprocket gears 42 and gear belt 44 depicted in FIG. 3.

Figure 6:
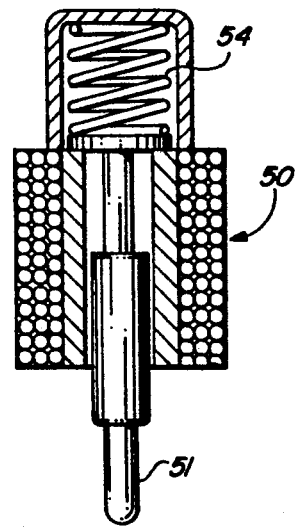
FIG. 6 is a sectional view of a particular element of the arrangement of FIG. 1.

As shown in FIG. 3, the sprocket gear 42A has a radially directed bore hole 52 and a solenoid 50 is mounted on the side rail of the frame 12 with a pin 51 which can be extended into the hole 52 or retracted therefrom when the solenoid 50 is actuated. This solenoid and pin arrangement 50, 51 is illustrated in greater detail in the sectional view of FIG. 6. This arrangement includes a biasing spring 54 which urges the pin 51 out the other end of the solenoid 50. When in alignment with the hole 52 of the sprocket gear 42A, the pin 51 enters the hole 52 and retains the sprocket gears 42A, 42B against rotation. This causes the motors 14 with disks 16 to be aligned generally in the alignment illustrated in FIG. 1. This alignment is also shown in the schematic of FIG. 5 in which the axes of the motor/disk combinations are along the torque or T-axis 26. The belt 44 is in a figure-8 configuration which requires that, when the pin 51 is retracted from the hole 52, any rotation of the motors 14 about their respective pivot axes will be in unison but in opposite directions.

To perform the demonstration for which the model 10 is set up as shown in FIG. 1, the motors 14 are energized to develop shaft rotation in the same direction. This is indicated by the arrows on the disks 16A and 16B in FIG. 5. In accordance with Newton's Third Law of Motion for Rotation the frame 12, being free to rotate about the vertical axis 26, rotates in the direction opposite to the rotation of the disks 16, as indicated in FIG. 4. The rotational velocity of the frame 12 in response to the torque generated by the motors 14 will be a function of the magnitude of that torque and the mass of the frame 12 and related structure which rotates with it. Generally, the operator will only apply power to the motors 14 for a brief interval, after which the motors, disks and frame are in a coasting mode.

At a time chosen by the operator, the solenoid 50 is energized to retract the pin 51 from the hole 52 and the motor-disk combinations are now free to pivot about the pivot axes 30 in response to the gyroscopic forces generated by the rotating structures, constrained only by the sprocket gear and belt arrangement of the gears 42 and belt 44. The result is an abrupt rotation of the motors 14 about the pivot axes 30 to assume the positions shown in FIG. 2, which are essentially orthogonal to the positions shown in FIG. 1 of alignment with the torque axis. It will be noted that the relative directions of rotation of the disks 16A and 16B are now opposite to each other. These opposite directions of rotation develop opposing precession forces about the torque axis 26. The opposing precession forces are applied to the frame 12 through the axles 30 and abruptly terminate the rotation of the frame 12.

What this model demonstrates is that an object in space equipped with such an arrangement can be powered to shift its angular orientation relative to a particular torque axis by energizing the motors in the manner indicated in FIG. 4. At the appropriate point in time when the desired angular correction has been achieved, the motor-disk combinations 13 are released from their retention position in alignment with the torque axis, after which they abruptly pivot to assume the positions as shown in FIG. 2 and the precession forces immediately terminate any further rotation of the object about the torque axis. Complete attitude control of a space platform can be achieved by installing systems such as that of FIGS. 1-5 along each of the three orthogonal axes in space. This control of platform attitude in three coordinates can be achieved through the use of embodiments of the present invention without the necessity for expending fuel or the use of positioning gas jets. All that is required for the operation of such an embodiment of the invention for attitude correction on space platforms is the application of electrical energy, something which is in relative abundance in space from the solar arrays with which space vehicles are equipped.

It should be noted that for effective operation of the first embodiment, the respective motor-disk combinations cannot be in perfect alignment with each other along the torque axis (FIG. 5). In order for the results described hereinabove to occur upon retraction of the retaining pin 51, at least one motor-disk unit must be slightly displaced from true axial alignment. I have found the described operation will be effective if the units are out of alignment by approximately 10 to 15 degrees. This slight misalignment is established by the way in which the belt 44 is installed on the sprocket gears 42A, 42B and the positioning of the retaining pin and the bore hole in the sprocket gear. The system can be set up with all of the misalignment residing in one of the motor-disk combinations 13 or with the angular displacement being divided between the two combinations.

It should also be understood that the precession forces which drive the motor-disk units 13 to pivot out of the aligned position are only developed if the frame is actually rotating. Satellites and other space objects generally have substantial mass compared to their attitude control mechanisms. Thus the torque which is applied to the space platform, and which will result in a very slight angular displacement of the space platform in a given time interval, should be applied in a manner which permits the frame of the stabilization system to rotate at a higher rate than the space platform. This can be accomplished by the arrangement schematically illustrated in FIG. 7. This figure shows a single-axis stabilization system 10 mounted by a support arrangement to a base 60 which is to be affixed to the space platform. The system 10 is supported for pivotable rotation about its torque axis, represented by the broken line 26, by pivot shafts 62, 64 at opposite ends of the system 10. These shafts are in turn mounted in clutch members 66, 68 which are supported on the base 60 by legs 69.

Clutch 66 is an over-running clutch which permits relative rotation in one direction only. As known in the art, such a clutch comprises inner and outer members with sprags in between and with heavy roller bearings supporting the shaft 62. The overrunning clutch permits overrun-freewheel in one direction while instantly and automatically locking its sprag members to prevent relative rotation in the opposite direction. Thus the clutch 66 permits the frame of the system 10 to rotate freely about the torque axis 26 in one direction while serving to block rotation of the base 60 (and attached space platform) in the opposite direction when the frame of the system 10 is fixed in position by the precession forces which are developed as described above.

The clutch 68 is a slip clutch which allows rotation of the frame of the system 10 at a rate greater than the rotation of the space platform but will, at the same time, develop limited friction to transmit a modicum of torque from the system 10 to the base 60. In this manner, a torque generated by the system 10 is effective to correct the orientation of the space platform while permitting the frame of the system 10 to rotate as necessary in order to develop the precession forces when the rotating motor-disk combinations are released for pivoting about their transverse axes. The clutch 68 may be of the electromagnetic, powdered iron type long used in washing machine drives.

Figure 7:
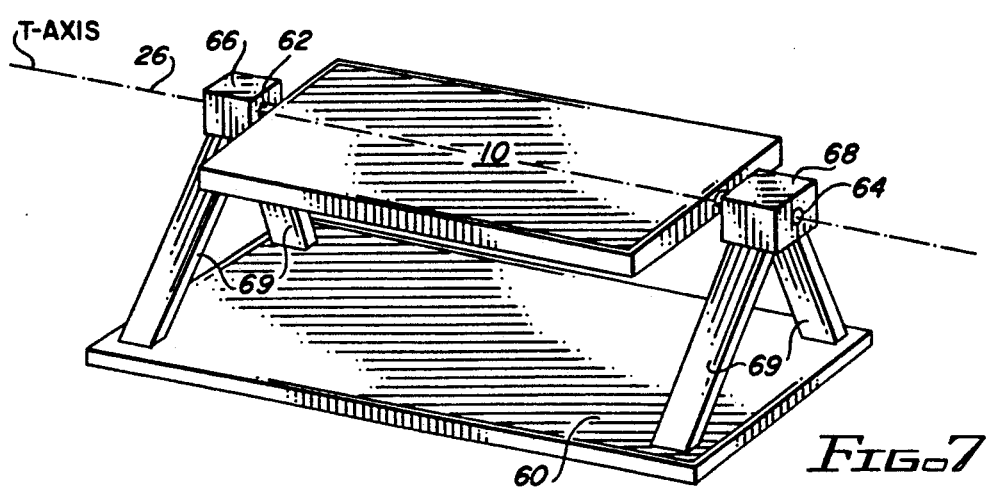
FIG. 7 is a schematic view of a mounting arrangement for embodiments of the invention.
Figure 8:
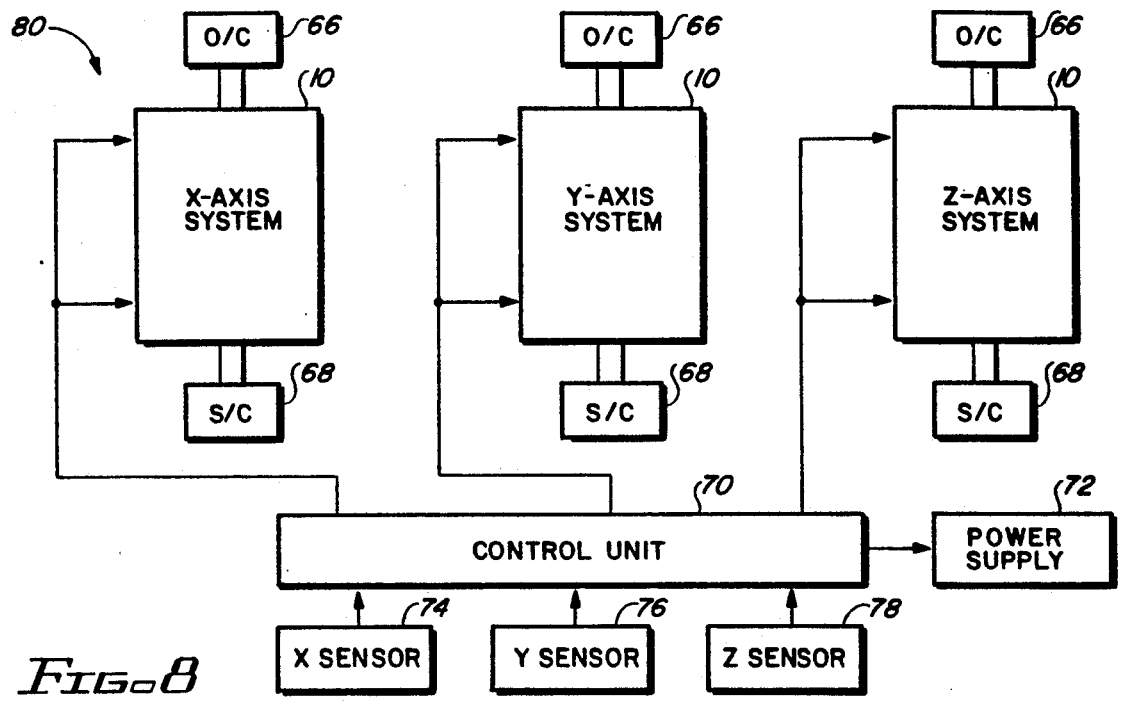
FIG. 8 is a schematic block diagram of a stabilization system in accordance with the present invention.

FIG. 8 is a schematic block diagram illustrating the way in which systems in accordance with the present invention may be utilized in three-axes control of a space platform. FIG. 8 represents three stabilization systems 10 with associated sensing and control components in an overall stabilization system 80. One system 10 is provided for each of the three orthogonal axes in an X-Y-Z coordinate system. Each is mounted to the space platform by an over-running clutch 66 and a slip clutch 68 as shown in FIG. 7. A control unit 70 and associated power supply 72 are provided and there are corresponding sensors 74, 76 and 78 respectively, for the three orthogonal coordinates X, Y and Z. As is customary with space platforms, satellites, etc., the power supply includes an array of solar cells which can provide power for an indefinite length of time.

In the operation of such a system, the control unit 70 applies appropriate control signals to a particular one or more of the axis control systems 10 in accordance with signals received from the attitude sensors. For example, if the X sensor 74 provides a signal to the control unit 70 indicating a slight angular displacement of the space platform from the desired attitude about the X-axis, the control unit 10 applies corresponding power and control signals to the X-axis system to develop the correction torque needed to compensate for the detected deviation and restore the desired spatial orientation relative to the X-axis. Compensation for angular deviations detected with respect to the Y and Z axes is developed in a similar manner by controlling the Y-axis system or the Z-axis system correspondingly.

Figure 9:
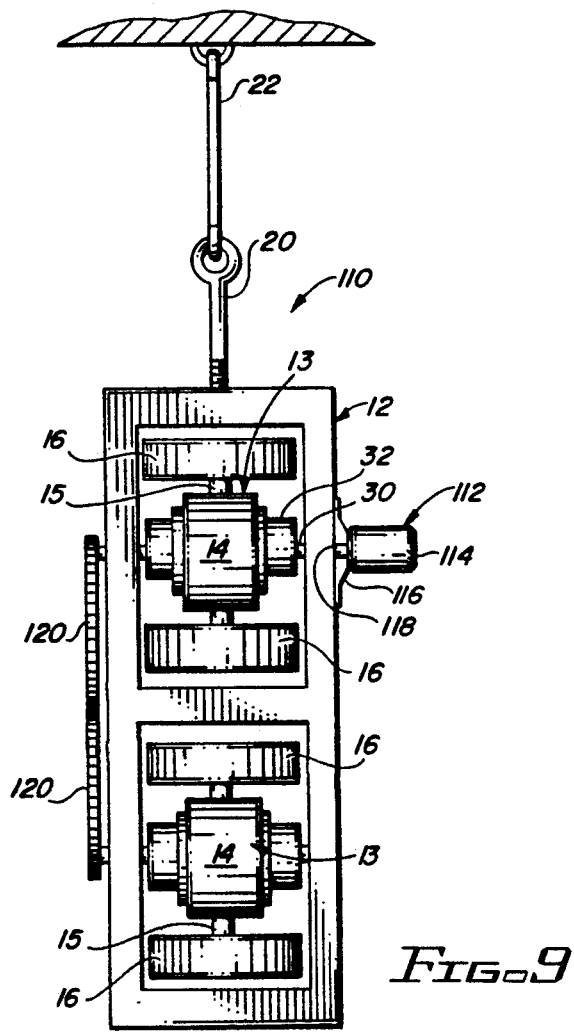
FIG. 9 is a schematic block diagram of an alternative arrangement to that of FIGS. 1-6.

In the alternative embodiment depicted in FIG. 9, a system 110 is shown which is similar in most aspects to the arrangement depicted in FIG. 1. Where like elements are shown in both arrangements, the same reference numerals are employed. One departure from the arrangement 10 of FIG. 1 is the use of a pair of interengaged sector gears 120 in place of the gears 40 which are interconnected by a figure-8 belt. The gears 120 are approximately 200 degree sectors which serve to maintain the synchronism between the two motor-disk units 13 from the vertical alignment attitude shown in FIG. 9 to an orthogonal position in either direction.

In addition, in the system 110 of FIG. 9, there is provided a pivoting system 112 comprising a motor 114 mounted to the frame 12 by means of a bracket 116. The motor 114 has a shaft 118 which is coupled to the shaft 30 of the upper motor disk unit 13. This dispenses with the solenoid-and-retainer arrangement of FIG. 6. It also provides the pivoting force for the motor disk units 13 which is required when the frame 12 is rotating at low angular velocity. Unless a certain minimal rotational velocity of the frame 12 is developed, the motor disk units 13 do not develop enough precessional force to pivot about the axes 30. The motor 114 is selectively energized to develop this pivoting force when needed. Once the motor disk units 13 have assumed the directions orthogonal to the frame 112, the opposing precessional forces developed by the respective units will stop the rotation of the frame 12, as described in connection with the operation of the first embodiment of FIGS. 1-5. Preferably the motor 114 is a stepping motor so that its angular displacement can be precisely controlled, as well as being set to a selected angular position.

Although there have been described hereinabove various specific arrangements of a stabilization system for a freely rotatable platform in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus for controlling the orientation of a body about a selected directional axis comprising:
   a frame which is rotatable about said selected axis;
   a plurality of gyroscopic units pivotably mounted to said frame for rotation about respective pivot axes which are orthogonal to said selected axis, each unit including at least one rotatable disk and a motor coupled to selectively drive said disk in rotation about a central axis of said unit;
   means for orienting the units with their central axes generally aligned with said selected axis;
   means for subsequently energizing said motors to drive said disks in like-direction rotation about said selected axis, thereby applying torque in the opposite direction to said frame to develop rotation of said frame in said opposite direction about said selected axis; and
   means for simultaneously pivoting said units in opposite directions about their respective pivot axes while said disks are rotating, thereby developing opposing precessional forces from the interaction of the gyroscopic inertia of said units to stop further rotation of said frame.

2. The apparatus of claim 1 further including means for determining the duration of energization of said motors.

3. The apparatus of claim 2 further including means for selecting the direction of rotation of said motors.

4. The apparatus of claim 3 wherein said plurality of gyroscopic units is a multiple of two.

5. The apparatus of claim 4 wherein said plurality of gyroscopic units comprises a pair.

6. The apparatus of claim 5 further including retaining means for releasably retaining the orientation of said units in a preselected attitude approximating alignment with said selected axis.

7. The apparatus of claim 6 further including means for releasing said retaining means to permit said simultaneous pivoting of said units.

8. The apparatus of claim 7 wherein said means for simultaneously pivoting said units comprise a gear-belt system including gears mounted on respective axes of said units and a belt extending about said gears in a figure-8 configuration.

9. The apparatus of claim 7 wherein said means for simultaneously pivoting said units comprise a pair of intercoupled gears mounted on respective pivot axes.

10. The apparatus of claim 9 wherein said means for simultaneously pivoting said units further comprise a motor mounted on one of said pivot axes for both retaining said units in a preselected alignment orientation and selectively pivoting said units to positions approximating orthogonality with said selected axis.

11. The apparatus of claim 1 wherein said means for orienting the units comprise means for aligning at least one of said units with its central axis slightly displaced angularly from said selected axis.

12. The apparatus of claim 1 wherein each unit includes a pair of rotatable disks mounted at opposite ends of said motor on a central motor shaft in order to be driven in the same direction of rotation when said motor is energized.

13. The apparatus of claim 12 furthur comprising means for pivotably mounting said units to said frame, said pivotably mounting means comprising a pair of transverse axles for each motor extending outwardly from opposite sides of said motor, and bearings supporting said axles in said frame on opposite sides of the motor.

14. The apparatus of claim 13 wherein all components of each gyroscopic unit are balanced for ready rotation about the pivot axis of said unit.

15. The apparatus of claim 14 wherein said plurality comprises a pair of units which are balanced with respect to each other to develop equal but opposing precessional forces during the operation of said apparatus.

16. The apparatus of claim 1 further including clutching means mounted between said frame and said body for selectively transmitting torque between the frame and the body.

17. The apparatus of claim 16 wherein said clutching means comprise an over-running clutch for permitting the frame to rotate in only one direction relative to said body.

18. The apparatus of claim 16 wherein said clutching means comprise a friction clutch for permitting limited slippage in the transmission of torque between the frame and the body.

19. A balanced inertial guidance system for selectively controlling the orientation of a body with respect to three mutually orthogonal axes comprising:

three sets of apparatus, each of said sets being oriented to control the orientation of said body about a corresponding different one of said three orthogonal axes;

each set comprising:
 a frame which is rotatable about its corresponding axis;
 a plurality of gyroscopic units pivotably mounted to said frame for rotation about respective pivot axes which are orthogonal to said corresponding axis, each unit including at least one rotatable disk and a motor coupled to selectively drive said disk in rotation about a central axis of said unit;
 means for orienting the units with their central axes generally aligned with said corresponding axis;
 means for subsequently energizing said motors to drive said disks in like-direction rotation about said corresponding axis, thereby applying torque in the opposite direction to said frame to develop rotation of said frame in said opposite direction about said corresponding axis; and
 means for simultaneously pivoting said units in opposite directions about their respective pivot axes while said disks are rotating, thereby developing opposing precessional forces from the interaction of the gyroscopic inertia of said units to stop further rotation of said frame;

a control unit coupled to a power supply and to each of said three sets of apparatus for providing electrical power to operate the apparatus;

a plurality of sensors corresponding respectively to said three orthogonal axes and individually coupled to sense deviation of orientation of the body from a corresponding axis; and means coupling said sensors to said control unit to initiate correction of the orientation of said body with respect to a particular axis upon detection of deviation of the body from said axis.

20. A method of controlling the orientation of a body about a selected directional axis, wherein said body includes a frame which is rotatable about said selected axis and a plurality of gyroscopic units pivotably mounted to said frame for rotation about respective pivot axes which are orthogonal to said selected axis, each unit including at least one rotatable disk and a motor coupled to selectively drive said disk in rotation about a central axis of said unit, said method comprising the steps of:

orienting the units with their central axes generally aligned with said selected axis;

subsequently energizing said motors to drive said disks in like-direction rotation about said selected axis, thereby applying torque in the opposite direction to said frame to develop rotation of said frame in said opposite direction about said selected axis; and thereafter pivoting said units simultaneously in opposite directions about their respective pivot axes while said disks are rotating, thereby developing opposing precessional forces from the interaction of the gyroscopic inertia of said units to stop further rotation of said frame.

21. The method of claim 20 wherein said body includes a separate frame and a corresponding plurality of gyroscopic units as defined in claim 20 for each of three mutually orthogonal axes and a corresponding plurality of directional sensors, one for each of said axes, which method comprises the steps of:

orienting the gyroscopic units for each of said three axes with their central axes generally aligned with the corresponding one of the three axes;

sensing the deviation of the orientation of said body from a particular one of the mutually orthogonal axes;

energizing the motors of the gyroscopic units in the separate frame which corresponds to said particular axis;

subsequently energizing said motors to drive said disks in like-direction rotation about the axis of said corresponding frame, thereby applying torque in the opposite direction to said frame to develop rotation of said frame in said opposite direction about its central axis in order to correct said sensed deviation of orientation; and thereafter pivoting said units simultaneously in opposite directions about their respective pivot axes while said disks are rotating, thereby developing opposing precessional forces from the interaction of the gyroscopic inertia of said units to stop further rotation of said frame.

* * * * *